UNITED STATES PATENT OFFICE.

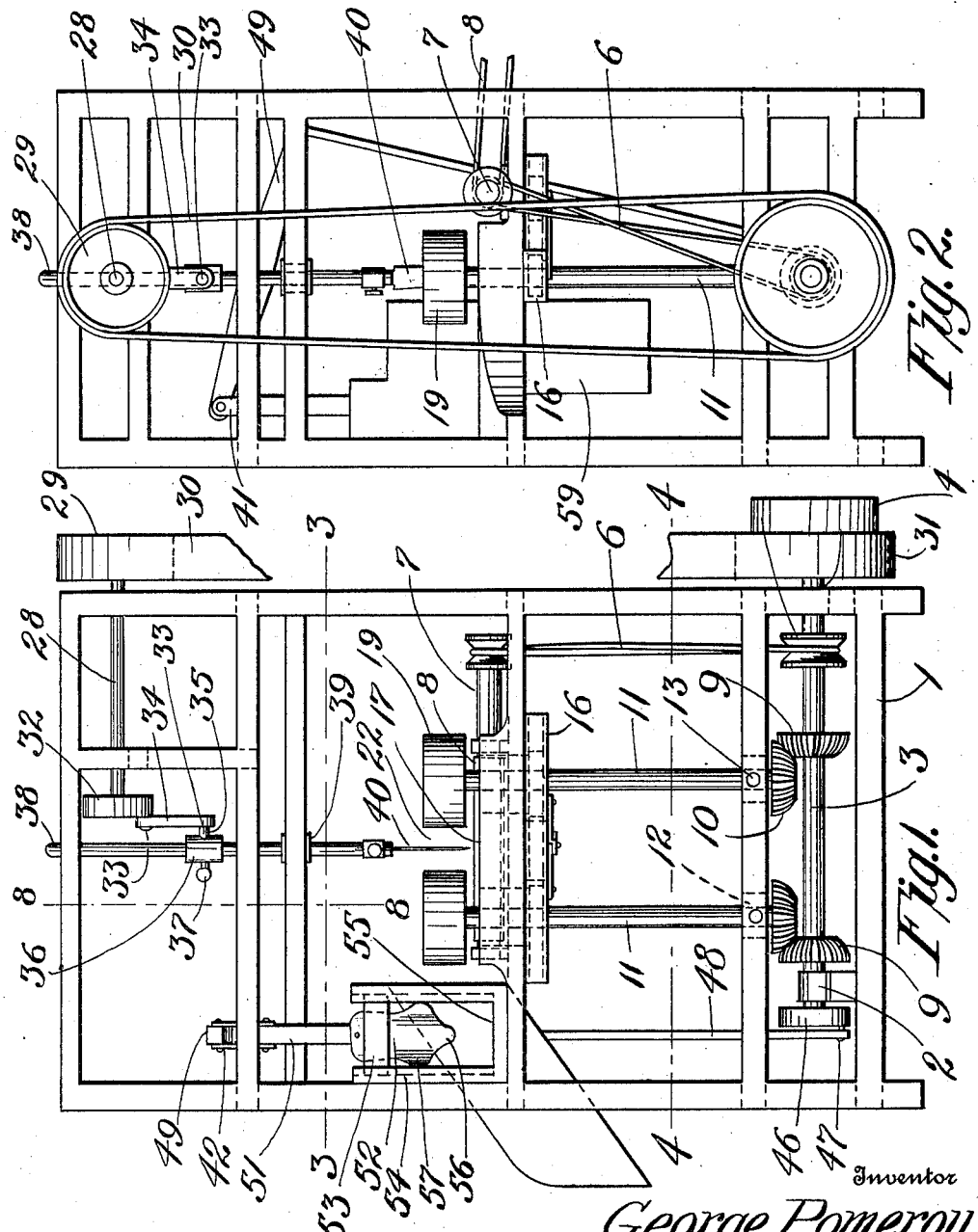

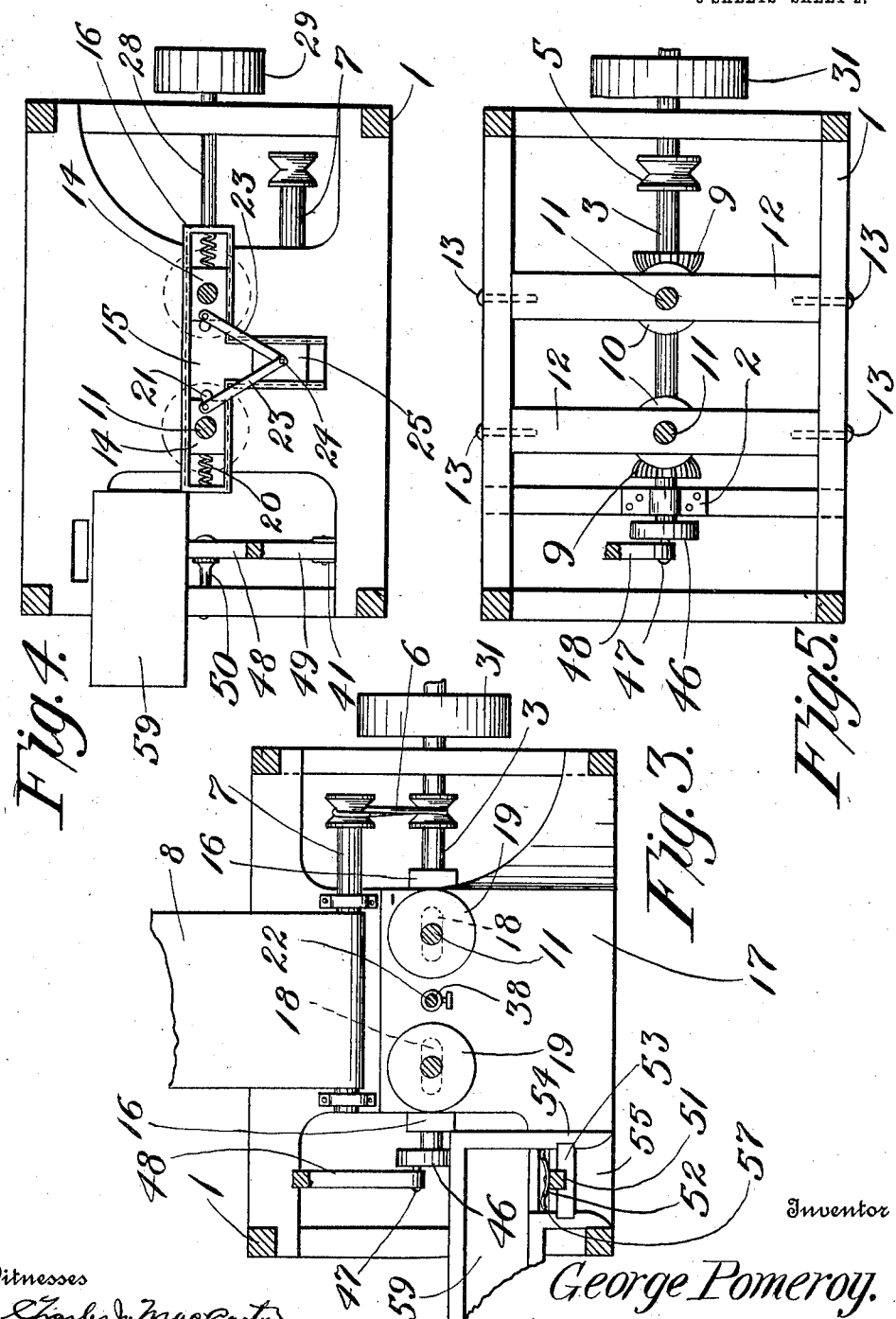
G. POMEROY.
FISH DRESSING MACHINE.
APPLICATION FILED FEB. 23, 1911. RENEWED JULY 12, 1912.
1,036,899. Patented Aug. 27, 1912.
3 SHEETS—SHEET 2.

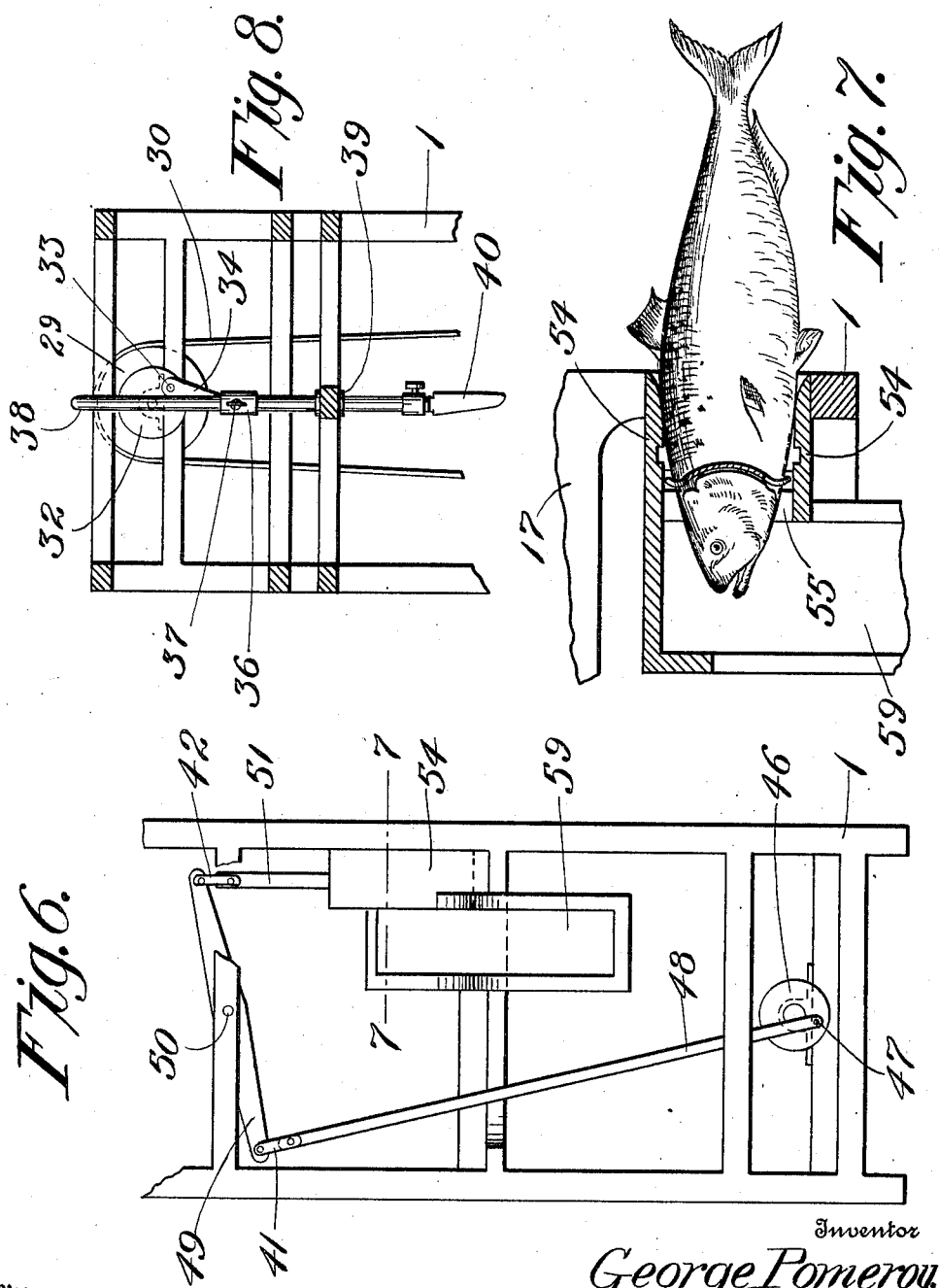

GEORGE POMEROY, OF ST. IGNACE, MICHIGAN.

FISH-DRESSING MACHINE.

1,036,899. Specification of Letters Patent. Patented Aug. 27, 1912.

Application filed February 23, 1911, Serial No. 610,334. Renewed July 12, 1912. Serial No. 709,067.

*To all whom it may concern:*

Be it known that I, GEORGE POMEROY, a citizen of the United States, residing at St. Ignace, in the county of Mackinac and State of Michigan, have invented certain new and useful Improvements in Fish-Dressing Machines, of which the following is a specification.

My invention relates to improvements in fish dressing machines, and has for its leading object the provision of an improved machine for beheading and splitting fish.

A further object of the invention is the provision of an improved machine of this character which will automatically adapt itself to acommodate fish of various sizes.

Another object of my invention is the provision of a machine having improved knife operating mechanism for decapitating the fish and for splitting the same and having an improved form of knife whereby the head of the fish may be removed with a minimum waste of the edible flesh of the fish.

Other objects and advantages of my improved fish dressing machine will be apparent from the following description taken in connection with the accompanying drawings and it will be understood that I may make any modification in said construction within the scope of the claims without departing from or exceeding the spirit of the invention.

Figure 1 represents a front elevation of my complete machine. Fig. 2 represents a side elevation thereof. Fig. 3 represents a sectional view on line 3—3 of Fig. 1. Fig. 4 represents a section on line 4—4 of Fig. 1 looking upward. Fig. 5 represents a sectional view on line 4—4 looking downward. Fig. 6 represents a detailed side elevation of the beheading device. Fig. 7 represents a sectional view on line 7—7 of Fig. 6, showing the knife in the process of decapitating the fish, and Fig. 8 represents a fragmentary vertical section on line 8—8 of Fig. 1.

In the drawings, the numeral 1 designates the supporting framework of my machine having the bearings 2 supported by the base thereof in which is journaled the shaft 3 bearing on one end the pulley 4 for the driving belt and having secured adjacent the pulley but within the frame the grooved pulley 5 around which passes the cross belt 6 leading to and driving the conveyer shaft 7 which is journaled in the intermediate portion of the frame, and drives the endless conveyer 8 which passes thereover.

Secured on the shaft 3 and spaced a distance apart are the pair of round edged or toothed miter gears 9 which engage the similar gears 10 secured to the lower ends of the shafts 11 which are supported at their lower ends by the plates 12 pivotally secured to the frame by the pins 13, the upper ends of said shafts being journaled in the slide blocks 14 slidably mounted in the groove 15 of the bar 16 which is secured to the frame 1. Secured to the upper side of the bar 16 is the fish receiving table 17, the ends of the shafts 11 projecting above said table through the slots 18 and having secured thereon the wheel or guide rollers 19 which are thus driven by the shaft 11.

The method of securing the shafts 11 in desired relative position will be best understood by reference to Fig. 4, from which it will be seen that helical springs 20 are interposed between the ends of the bar 16 and the outer ends of the blocks 14 to force said blocks inward toward each other to bring the peripheries of the rollers 19 into close proximity, the inward movement of the shafts and rollers being limited by the abutments 21 depending into the guideway 15 so that there will at all times be a space 22 between said rollers to receive the fish. It will be seen that the meshing of the gears 9 and 10 is such as to rotate the rollers 19 in opposite directions to feed the article in engagement with the periphery of the rollers rearwardly through the space 22 onto the conveyer 8, the rollers spreading apart to increase the size of said space to accommodate various thicknesses of fish, the rounded teeth of the gears rocking on each other to remain in driving mesh irrespective of the pivotal movement of the shafts. To cause the two rollers 19 to each move the same distance, I secure to each of the blocks 14 a link 23, said links having their ends secured by the common pivot 24 to the slide block 25 mounted in the groove 26 of the arm 27 which projects rearwardly from the block 16, the links thus forming a toggle lever the lateral movement of one of the rollers through the link of its block drawing the slide block 25 forward to impart a like movement to the other roller.

Journaled in the frame at the top thereof is the shaft 28 bearing the pulley 29 over which passes the drive belt 30 connected to the pulley 4 on the shaft 3, while secured at the inner end of the shaft 28 is the wheel 32 having the eccentric pin 33 projecting from its face, said pin having engaged thereon the link 34 pivotally engaged by the lug 35 of the collar 36 bearing the clamp screw 37. It will thus be seen that upon the rotation of the shaft 28 the pin 33 serves as a crank to reciprocate the link 34 and collar 36, while passing through the collar 36 is the bar 38 slidably supported in the frame by the guides 39 and having secured to its lower end the knife blade 40 which bisects the space 22.

In the use of my machine to split a fish, a headless body of the fish is placed back upward between the rollers 14, and the set screw 37 serves to clamp the bar 38 to cause the same to support the point of the knife a slight distance above the table 17, when at its lowest point, the rotation of the shaft 3 through its disk and link connections reciprocating the knife at a rapid rate, the knife passing down at the side of the vertebral column of the fish and splitting it lengthwise, the two halves being connected by the uncut lower side or belly of the fish which permits the opening out of the fish into a single flat piece.

To behead the fish preparatory to splitting the same I secure on the end of the shaft 3 the disk 46 having projecting therefrom the eccentric pin 47 on which is pivotally engaged the lower end of the link 48 which projects upward above the worktable 17 and has its upper end pivotally connected by the strap 41 with the lever 49 secured by the pivot pin 50 intermediate its length to the frame, the other end of said lever being connected by the strap 42 with the link 51 having pivotally secured to its lower end the knife member 52 having a guide block 53 moving between the guides 54 carried by the frame, a block 55 being secured at the lower end of the guides and having a slot therein through which the knife moves, said block 55 serving as a table for the fish during the operation of removing the head. The knife blade 52 as will be seen by reference to the drawings, is in substantially the shape of a stub pen having the entering point 56 and the rounding central portion with reversely bent edges 57, whereby the knife in descending will cut out the entire gill of the fish while leaving the edible flesh above and below the curved gill.

From the foregoing description taken in connection with the drawings, the operation of my machine will be readily understood and it will be seen that the blade 52 is constantly reciprocating, and to behead the fish it is merely necessary to place the fish on the block 55 with the gill slightly in advance of the knife slot. The knife 52 having cut off the head, the neck of the fish is then placed between the rollers 19 which carry the body of the fish forward against the splitting knife 40, the fish being removed by the carrier 8, the heads dropping from the block 55 into the chute 59.

It is evident that I have provided a simple and readily operated machine for removing the heads of and splitting fish which can be readily installed and operated and which will automatically adapt itself to split fish of various sizes along the center and which will prove thoroughly practical and efficient in every particular.

I claim:

1. In a fish dressing machine, the combination with a frame, of a work table supported by the frame, a knife blade mounted to reciprocate above the work table, endless guide rollers mounted above the work table on each side of the knife and rotated in opposite directions to force a fish against the knife, and connections between the rollers to cause lateral movement of one of the rollers to impart a similar lateral movement in opposite direction to the other roller, whereby both rollers at all times are equi-distant from the reciprocating knife.

2. A fish dressing machine, including a frame, a knife reciprocally mounted within the frame, laterally adjustable guide rollers supported by the frame which are normally an equal distance from the knife, and connections between the guide rollers for holding the guide rollers at all times a space equi-distant from the knife irrespective of any lateral pressure exerted against one of the said guide rollers.

3. A fish dressing machine, comprising a frame, a transversely disposed shaft journaled in the frame and bearing a pair of miter gears, bearing blocks pivotally supported by the frame above the shaft and adjacent the miter gears carried thereby, vertical shafts rotatably mounted within the bearings and having miter gears secured on their lower ends in mesh with the miter gears of the transverse shaft, guide rollers carried by the upper ends of the vertical shafts, a reciprocable knife blade bisecting the space between the guide rollers, and connections between the vertical shafts for causing the two shafts to swing equally in opposite directions, the pivotal mounting of the bearings for the shafts serving to permit of said movement of the vertical shafts.

4. A fish dressing machine, comprising a frame, a driven shaft journaled therein, a pair of plates pivotally secured to the frame above said shaft, vertical shafts having their lower ends journaled in said plates, intermeshing miter gears carried by the driven shafts and the other shafts for driving the latter, a guideway secured to the frame, slide blocks mounted in said guideway, said blocks having the upper ends of the vertical shafts journaled therein, toggle levers connecting the slide blocks to operate in unison, rollers secured to the upper ends of the shafts, and a knife blade located between the rollers and having connections between the driven shaft and the blade to reciprocate said blade.

5. A fish dressing machine, including a frame, a reciprocable knife member mounted in the frame, laterally adjustable guide rollers disposed at equal distances on the side of the knife, and means for keeping said rollers equidistant from the knife irrespective of the lateral adjustment thereof.

In testimony whereof I affix my signature, in the presence of two witnesses.

GEORGE POMEROY.

Witnesses:
H. ELLIS CHANDLEE,
M. LOUISE LOWE.

Copies of this patent may be obtained for five cents each, by addressing the "Commissioner of Patents, Washington, D. C."